United States Patent
Gibbs et al.

(10) Patent No.: US 11,270,670 B2
(45) Date of Patent: Mar. 8, 2022

(54) DYNAMIC VISUAL DISPLAY TARGETING USING DIFFRACTION GRATING

(71) Applicant: Kyndryl, Inc., New York, NY (US)

(72) Inventors: Nathaniel J. Gibbs, Iowa City, IA (US); Matthew Mitchell Lobbes, Northlake, TX (US); Brian James Snitzer, Lancaster, PA (US); Michael Treadway, Keller, TX (US)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 16/699,672

(22) Filed: Dec. 1, 2019

(65) Prior Publication Data

US 2021/0166657 A1    Jun. 3, 2021

(51) Int. Cl.
  *G09G 5/37*  (2006.01)
  *G06Q 30/02*  (2012.01)
  *G02B 5/18*  (2006.01)
  *G06N 5/02*  (2006.01)
  *G06F 3/01*  (2006.01)

(52) U.S. Cl.
  CPC .............. *G09G 5/37* (2013.01); *G06F 3/013* (2013.01); *G06N 5/02* (2013.01); *G06Q 30/0261* (2013.01); *G06Q 30/0271* (2013.01); *G09G 2354/00* (2013.01)

(58) Field of Classification Search
  CPC ........... G09G 5/37; G02B 6/0068; G02B 5/18
  See application file for complete search history.

(56) References Cited

U.S. PATENT DOCUMENTS

| | | | |
|---|---|---|---|
| 6,763,148 | B1 | 7/2004 | Sternberg |
| 7,643,671 | B2 | 1/2010 | Dong |
| 8,224,108 | B2 | 7/2012 | Steinberg |
| 9,639,740 | B2 | 5/2017 | Ganong |
| 9,712,811 | B2 | 7/2017 | Keys |
| 10,142,620 | B2 | 11/2018 | Wang |
| 10,429,573 | B2 * | 10/2019 | Park ................. G02B 6/0038 |
| 2010/0002079 | A1 | 1/2010 | Krijn |
| 2010/0149640 | A1 * | 6/2010 | Paek .................. G02B 5/1828 359/566 |
| 2011/0122329 | A1 | 5/2011 | Broughton |
| 2013/0007801 | A1 | 1/2013 | Lehtonen |
| 2014/0176580 | A1 | 6/2014 | Brown |
| 2014/0282719 | A1 | 9/2014 | Zustak |

(Continued)

OTHER PUBLICATIONS

Disclosed Anonymously, "Method and system for displaying multiple personalized views on an autostereoscopic display device", An IP.com Prior Art Database Technical Disclosure, IP.com No. IPCOM000219383D, Publication Date: Jun. 27, 2012, 8 pages.

(Continued)

*Primary Examiner* — Yi Yang
(74) *Attorney, Agent, or Firm* — Ken Han, Esq.; Kevin P. Radigan, Esq.; Heslin Rothenberg Farley & Mesiti P.C.

(57) ABSTRACT

Embodiments of the present invention provide a computer system, a computer program product, and a method that comprises identifying a first user of a plurality of users; identifying a location for the first user; transmitting input of the first user to a server computing device; and simultaneously displaying multiple personalized, dynamic displays using diffraction grating based off of input of the first user and location of the first user.

20 Claims, 3 Drawing Sheets

(56) References Cited

U.S. PATENT DOCUMENTS

| | | | | |
|---|---|---|---|---|
| 2016/0178383 A1* | 6/2016 | Mays | ................. | G01C 21/3673 |
| | | | | 701/408 |
| 2017/0163009 A1* | 6/2017 | Choi | ..................... | H01S 5/0687 |
| 2018/0120559 A1* | 5/2018 | Yeoh | .................... | G02B 5/3083 |
| 2019/0019218 A1* | 1/2019 | Thompson | .............. | G09F 19/14 |
| 2019/0179331 A1* | 6/2019 | Heo | .................. | G01C 21/3673 |

OTHER PUBLICATIONS

MirraViz MultiView "How-it-works, Magic or Physics?", Aug. 2, 2017 [Accessed Aug. 14, 2019], 4 pages, <https://mirraviz.blog/2017/08/02/mirraviz-multiview-how-it-works-magic-or-physics/>.

Gilmour, Bill, "My 445nm 1W Blue Laser Through A Matrix Diffraction Grating", YouTube, Jun. 24, 2011, 2 pages, <https://www.youtube.com/watch?v=SPWr4JE7QRw>.

"Diffraction Grating", Printed Oct. 31, 2019, 2 pages, <http://hyperphysics.phy-astr.gsu.edu/hbase/phyopt/gratcal.html>.

* cited by examiner

DYNAMIC VISUAL DISPLAY TARGETING USING DIFFRACTION GRATING

FIELD OF INVENTION

The present invention relates generally to the field of diffraction grating technology, and more specifically positional, dynamic displays using diffraction grating technology.

BACKGROUND

Diffraction grating technology is an optical component with a periodic structure that splits and diffracts light into several beams traveling in different directions. The directions of these beams depend on the spacing of the grating and the wavelength of the light so that the grating acts as the dispersive element. Gratings generally have ridges or rulings on their surface rather than dark lines. Such gratings can be either transmissive or reflective, and gratings that modulate the phase rather than the amplitude of the incident light are also produced, frequently using holography.

Diffraction grating can create multiple colors when illuminated in a wide spectrum (e.g., continuous) light source. The sparking effects from closely spaced narrow tracks on optical storage mediums are an example of interference effects in reflections from the closely spaced transmissive layers. Generally, a grating has parallel lines, and diffraction colors appear when one looks at a bright point source through a translucent covering.

Conventionally, positioning refers to the place that an image occupies in the mind of a consumer and how it is distinguished from the products of its competitors. However, positioning of displays differs from the conventional definition of positioning. Generally, positioning of displays is used to display different forms of information. These different forms of information may include advertisements, communication, directions, locations, etc.

SUMMARY

Embodiments of the present invention provide a computer system, a computer program product, and a method that comprises identifying a first user of a plurality of users; identifying a location for the first user; transmitting input of the first user to a server computing device; and simultaneously displaying multiple personalized, dynamic displays using diffraction grating based off of input of the first user and location of the first user.

DETAILED DESCRIPTION

Embodiments of the present invention recognize the need for ways to provide positional images to multiple consumers using diffraction grating technology in an environment comprised of computing devices. The positional images can display location-based information, such as retail advertisements located near the viewer. Embodiments of the present invention provide systems, methods, and computer program products for an improvement to existing positional display system technologies. Currently, there are display technologies capable of displaying a different image to a viewer depending on where the viewer is located in relation to the display, such as a billboard capable of displaying a different image to a different individual depending on the location and angle of the viewer. However, there exists a need for a program that is capable of positional, dynamic display technology that simultaneously displays multiple images via multiple wavelengths to multiple users depending on each user's location. For example, embodiments of present invention provides solutions for simultaneously displaying multiple personalized, dynamic displays to multiple users using multiple wavelengths and diffraction grating technology. For example, in this embodiment, a positional, dynamic display diffraction grating program ("program") improves current technologies by allowing two different displays to be shown to two different users based on the respective user's viewing angle. For example, embodiments of the present invention shows one wavelength of light (i.e., blue) to a viewer at a certain angle, while simultaneously showing a different wavelength (i.e., red) to a viewer at a different angle. This program creates an ability to display a specific image to a specific user and change its wavelength as the user changes their position relative to the display, while simultaneously displaying and changing its wavelength to a different user at a different angle. This specific image will be in the form of a personalized content. In this embodiment, content can be a personalized advertisement. In other embodiments, content can refer to positional information relevant to the user. For example, positional information can also include information surrounding an area of either the user (e.g., hours of operation of a building, road closures, anticipated traffic based on scheduled events such as concerts, real-time traffic, queue status of locations such as restaurant wait times, user shopping preferences, and changes in location (e.g., a gate change at the airport), etc.).

In another embodiment, this program creates the ability to deliver and display personalized content to multiple users simultaneously from a single display. The program will use the unique properties of diffraction grating technology to display one image to a user at position A using wavelength A and from the same computing device, display a different image to a different user at position B using wavelength B, thereby displaying multiple personalized advertisements, personalized directions, personalized information, and personalized notifications simultaneously from a single computing device.

Figure 1:
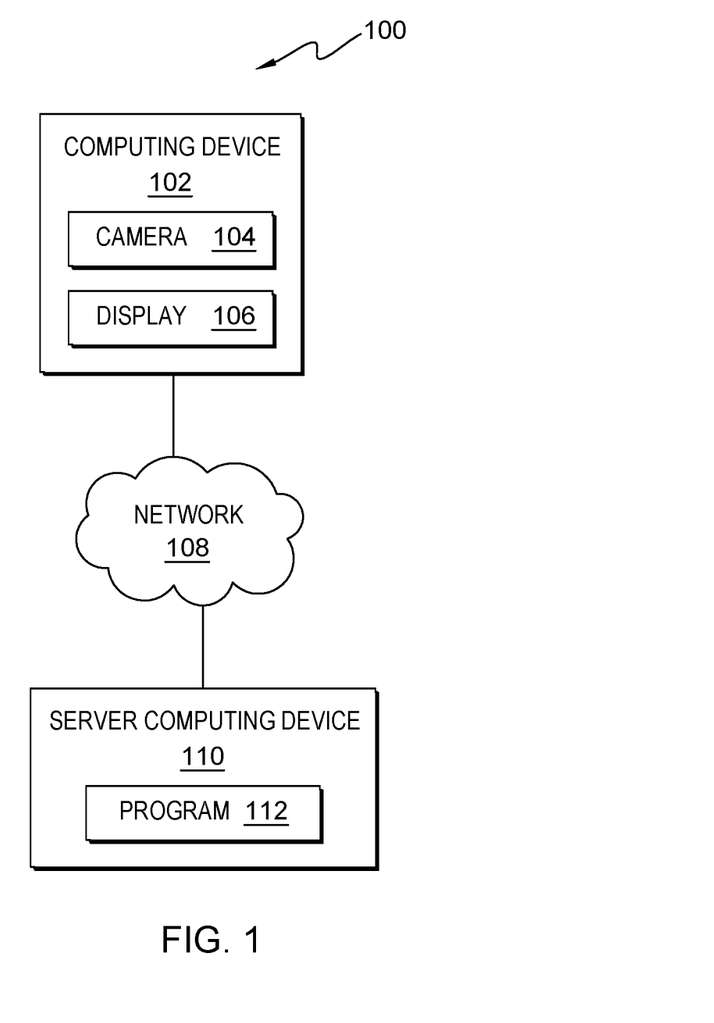
FIG. 1 is a functional block diagram depicting an environment with a computing device connected to or in communication with a server computing device in accordance with at least one embodiment of the present invention.

FIG. 1 is a functional block diagram of a computing environment 100 in accordance with an embodiment of the present invention. The computing environment 100 includes a computing device 102 and a server computing device 110. The computing device 102 and the server computing device 110 may be desktop computers, laptop computers, specialized computer servers, or any other computing device known in the art. In at least one embodiment, the computing device 102 and the server computing device 110 may represent multiple computer devices or components to act as a single pool of seamless resources when accessed through a network 108. Generally, the computing device 102 and the server computing device 110 may be representative of any electronic devices, or a combination of electronic devices, capable of executing machine-readable program instructions, as described in greater detail with regard to FIG. 4.

The computing device 102 may include a camera 104 and a display 106, which receives, generates, and transmits input to a program 112 on the server computing device 110 via the network 108. The camera 104 continually tracks the position of all targeted users. The camera 104 is able to track a user by identifying a specific user and identifying the location of that specific user relative to the computing device 102. In another embodiment, the program 112 may be locally stored on the computing device 102. In this embodiment, the camera 104 identifies a user by either identifying demographic information using artificial intelligence technology to identify a specific user. For example, the camera 104 identifies user A due to user A's eye signature. In another embodiment, the camera 104 may use gait analysis to identify a specific user. In another embodiment, the camera 104 may use a user's smartphone information that is available through Wi-Fi or a cloud service to identify a specific user. The display 106 is able to display a specific image in relation to a specific user's position at a specific wavelength. As the user changes its angle relative to the user computing device 102, the display 106 will change the wavelength of the its display, which will have the effect of the displaying changing for the specific user based on that user's location. The display 106 uses diffraction grating technology to display different images at different wavelengths depending on a user's location relative to the computing device 102. For example, the display 106 is a billboard or an LED screen placed at a mall or an airport as a way of displaying image A, notification A, direction A, and communication A when a specific user (i.e., user A) is at a specific angle (i.e., 35 degrees) and distance from the computing device 102, while simultaneously displaying image B, notification B, direction B, and communication B when a different user (i.e., user B) is at a different angle (i.e., 60 degrees) and distance from the computing device 102. In another embodiment, the display 106 may deliver multiple images simultaneously to multiple users in relation to each user's angle and distance relative to the computing device 102. In another embodiment, the display 106 may display personalized advertisements based on the input transmitted and received from the program 112 that is tailored to each specific user.

The network 108 can be a local area network ("LAN"), a wide area network ("WAN") such as the Internet, or a combination of the two; and it may include wired, wireless or fiber optic connections. Generally, the network 108 can be any combination of connections and protocols that will support communication between the computing device 102 and the server computing device 110, specifically the program 112 in accordance with a desired embodiment of the invention.

The server computing device 110 includes the program 112 that received and interpreted the input generated by the computing device 102 through the camera 104. In this embodiment, the program 112 gathers the transmitted input, identifies the specific user, and generates personalized, dynamic displays for that specific user. In another embodiment, the program 112 may generate multiple personalized advertisements, personalized notifications, personalized directions, personalized communications, and personalized information for a specific user. In another embodiment, the program 112 may generate multiple personalized advertisements, personalized notifications, personalized directions, personalized communications, and personalized information for multiple specific users. In another embodiment, the program 112 may be stored locally on the computing device 102 instead of the server computing device 110. In this embodiment, the program 112 will transmit the generated personalized, dynamic display to the display 106 on the computing device 102 in order to be displayed to the specific users. In this embodiment, the program 112 calculates the specific wavelength for a specific image to be displayed to a specific user. In another embodiment, the program 112 calculates multiple specific wavelengths in order to display multiple images to multiple users. For example, the program 112 generates image A, notification A, direction A, and communication A specifically for user A when user A is in location A using wavelength A, while simultaneously generating image B, notification B, direction B, and communication B for user B when user B in is location B using wavelength B. In this example, the program 112 transmits the generated, personalized, and dynamic displays for user A and user B to the computing device 102 for display.

Figure 2:
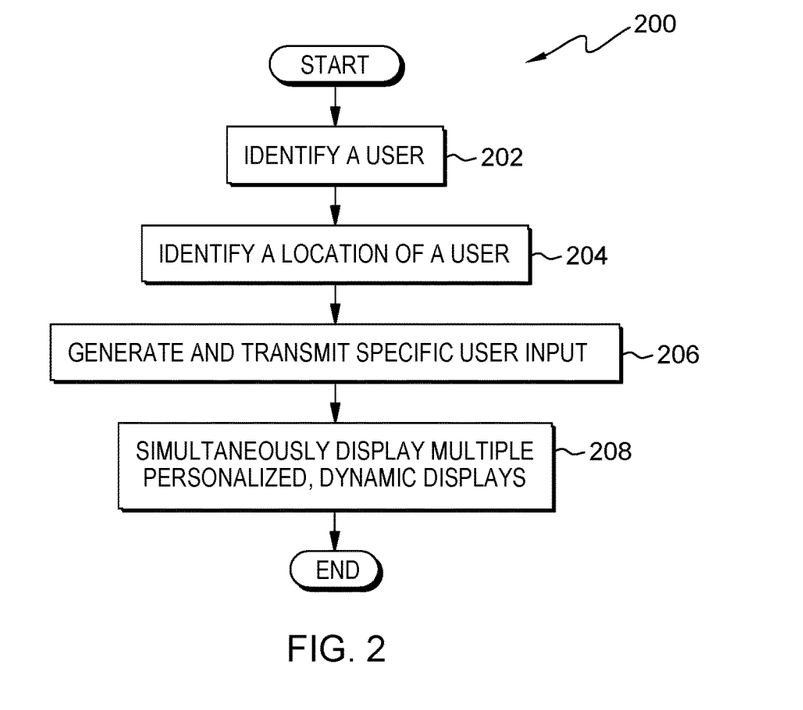
FIG. 2 is a flowchart illustrating operational steps for running a positional, dynamic display program task using diffraction grating technology, in accordance with an embodiment of the present invention.

FIG. 2 is a flowchart 200 illustrating operational steps for running a positional, dynamic image diffraction grating program, in accordance with an embodiment of the present invention.

In step 202, program 112 identifies a user. In this embodiment, the program 112 identifies a user by transmitting instructions to a camera 104 on a computing device 102 to capture one or more images. The program 112 may then use a combination of artificial intelligence algorithms combined with gait recognition, or smartphone recognition software to identify a specific user from the captured one or more images. For example, the program 112 enables the camera 104 to use artificial intelligence technology to identify a user specifically as user A by capturing multiple images of user A. In another embodiment, the program 112 may user artificial intelligence technology to simultaneously identify multiple users.

In step 204, the program 112 identifies a location of a specific user. In this embodiment, the program 112 identifies a location of a specific user by transmitting instructions to the camera 104 on the computing device 102 to capture one or more images of the location of the user. The program 112 may then use a combination of artificial intelligence algorithms with location prediction software to calculate specific distance and angle of a user in relation to the computing device 102 and predict the future path of the specific user from the captured one or more images. For example, the program 112 enables the camera 104 to use artificial intelligence technology and location predication software to identify when user A is in location A and predict user A possible route to location B by capturing multiple images of the specific user and the specific user's route. In another embodiment, the program 112 may transmit instructions to the camera 104 to simultaneously identify multiple users' locations.

In step 206, the program 112 transmits specific user input to a server computing device 110. In this embodiment, the program 112 transmits specific user input to the server computing device 110, and specific user input is defined as the specific user identify and specific user location from the images captured by the camera 104 and transmits this specific user information as input to the program 112 via the network 108. For example, after the program 112 identifies the specific identity user A and specific location of user A, the program 112 transmits the specific user information as input to the server computing device 110.

In step 208, the program 112 simultaneously displays multiple personalized, dynamic displays. In this embodiment, the program 112 transmits instructions to the display 106 to simultaneously display multiple personalized, dynamic displays for multiple users via multiple wavelengths at multiple locations. The program 112 simultaneously displays multiple personalized, dynamic displays by analyzing the specific user input received; generating personalized images, locations, notifications, and communications that would be relevant to the specific user input received; calculate specific user positioning by predicting user path; and changing the personalized images, locations, notifications, and communications as the specific user reaches a predetermined threshold, as discussed in greater detail with respect to FIG. 3. The program 112 changes the displayed, personalized images in response to the received input for a specific user. For example, the program 112 simultaneously displays a specific user's flight information, directions to the user's flight gate, notifications from the user's smart phone, and restaurants that are available along the user's route for a specific user form the input received. In this embodiment, the program 112 receives the generated input that comprises the specific identify and specific location of a specific user and generates personalized, dynamic displays to be displayed for that specific user depending on the user's location relative to the computing device 102. For example, the program 112 generates multiple personalized, dynamic images for user A when user A is in location A, predicts the route of user A, and changes the displayed personalized, dynamic image upon user A meeting a predetermined threshold. In this embodiment, the program 112 calculates the distance of the route, speed of the user, and time until certain events are scheduled to take place (i.e., flight departure time) in order to relay personalized communications and directions to help the user reach the certain event, eat, and any other task that the user may want to undertake while in route to the certain event. In this embodiment, the program 112 may change the personalized, dynamic image at each of these points that represent a predetermined threshold. In another embodiment, the program 112 may simultaneously generate multiple personalized, dynamic images for multiple users along each user's route. Therefore, the program 112 may change the personalized, dynamic image based on the user's predicted path, gaze, or personal input.

Figure 3:
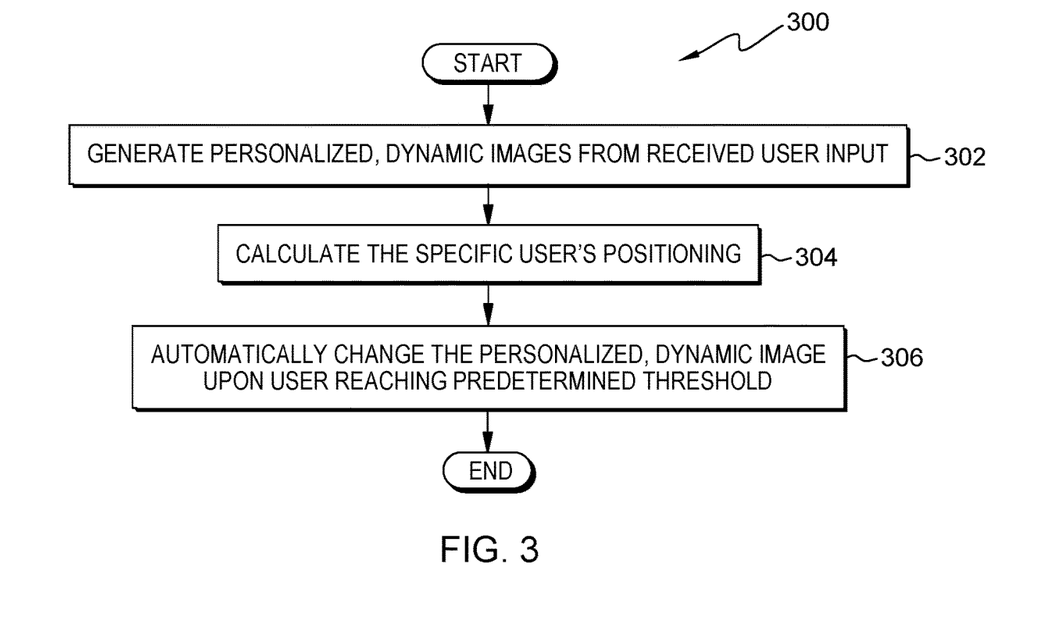
FIG. 3 is a flowchart illustrating the operational step for displaying personalized, dynamic images using a positional, dynamic display program using diffraction grating technology, in accordance with an embodiment of the present invention.

FIG. 3 is a flowchart 300 illustrating the operational step of the program 112 simultaneously displaying multiple personalized, dynamic images.

In step 302, the program 112 generates personalized, dynamic images from received specific user input. In this embodiment, the specific user input is defined as specific user identity found through artificial intelligence technology combined with gait recognition, and smartphone recognition software. In this embodiment, the specific user input is also defined as specific user location. In another embodiment, the program 112 generates multiple personalized, dynamic images for multiple specific users. For example, the program 112 generates a personalized dynamic image for one restaurant; and when a user crosses a threshold distance closer to another restaurant, the program 112 simultaneously generates a different personalized image for the restaurant displaying specials, hours of operation, queue times, etc.

In step 304, the program 112 predicts the specific user's route. In this embodiment, the program 112 predicts the specific user's route by using the specific user's location, speed of the user's walk, and the specific user's destination, which are considered the specific user input. In this embodiment, the program 112 tracks each location along the calculated route to determine a threshold. In this embodiment, the program 112 calculates the specific user's location by sending instructions to the camera 104 on the computing device 102 to track the specific user. In another embodiment, the program 112 simultaneously calculates multiple specific user's locations.

In step 306, the program 112 automatically changes the personalized, dynamic image once the specific user reaches a predetermined threshold. In this embodiment, the program 112 may display a personalized communication, image, direction, and advertisement based on the specific user input received, and the program will alter the personalized, dynamic image based on the location and speed of the specific user in relation to the predetermined threshold along the user's route. In this embodiment, the program 112 uses diffraction grating technology to simultaneously display multiple personalized, dynamic images to multiple specific users. In this embodiment, the program 112 simultaneously changes the personalized, dynamic image by altering the wavelength of the display 106 in relation to the location, angle, speed, and distance from a predetermined threshold. A predetermined threshold is defined as a location, time, communication, or event that the specific user may want gain knowledge of that is along the predicted route. The predetermined threshold may be a restaurant, change in flight status, change in gate status, message, phone call, or e-mail that the specific user should be notified of. By altering the wavelength in relation to the specific user's location, the personalized, dynamic image may only be viewed by that specific user due to the angle and the chosen wavelength. The program 112 changes the displayed, personalized images in response to the received input for a specific user. In another embodiment, the program 112 may automatically change the personalized, dynamic display on a wearable device, such as smart glasses or a smart watch. For example, the program 112 will display a personalized, dynamic communication, direction, or location specifically tailored for user A at wavelength A when user A is in location A, while simultaneously displaying a different personalized, dynamic image specifically tailored for user B at wavelength B when user B is in location B. Therefore, the program 112 may change the personalized, dynamic image based on the user's predicted path, gaze, or personal input.

Figure 4:
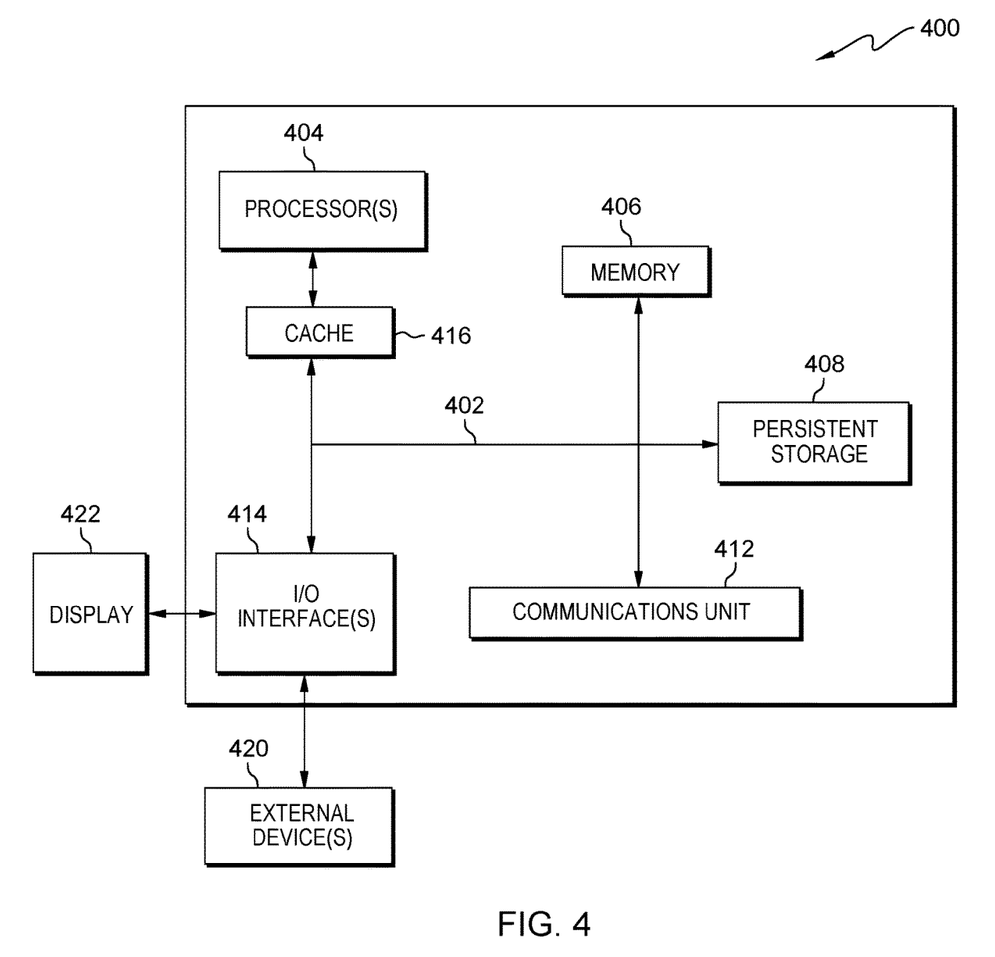
FIG. 4 is a block diagram of internal and external components of the computer systems of FIG. 1, in accordance with an embodiment of the present invention.

FIG. 4 depicts a block diagram of components of computing systems within a haptic display environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

A computer system 400 includes a communications fabric 402, which provides communications between a cache 416, a memory 406, a persistent storage 408, a communications unit 410, and an input/output (I/O) interface(s) 412. The communications fabric 402 can be implemented with any architecture designed for passing data and/or control information between processors (such as microprocessors, communications and network processors, etc.), system memory, peripheral devices, and any other hardware components within a system. For example, the communications fabric 402 can be implemented with one or more buses or a crossbar switch.

The memory 406 and the persistent storage 408 are computer readable storage media. In this embodiment, the memory 406 includes random access memory (RAM). In general, the memory 406 can include any suitable volatile or non-volatile computer readable storage media. The cache 416 is a fast memory that enhances the performance of the computer processor(s) 404 by holding recently accessed data, and data near accessed data, from the memory 406.

The program 112 may be stored in the persistent storage 408 and in the memory 406 for execution by one or more of the respective computer processors 404 via the cache 416. In an embodiment, the persistent storage 408 includes a magnetic hard disk drive. Alternatively, or in addition to a magnetic hard disk drive, the persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by the persistent storage 408 may also be removable. For example, a removable hard drive may be used for the persistent storage 408. Other examples include optical and magnetic disks, thumb drives, and smart cards that are inserted into a drive for transfer onto another computer readable storage medium that is also part of the persistent storage 408.

The communications unit 410, in these examples, provides for communications with other data processing systems or devices. In these examples, the communications unit 410 includes one or more network interface cards. The communications unit 410 may provide communications through the use of either or both physical and wireless communications links. The program 112 may be downloaded to the persistent storage 408 through the communications unit 410.

The I/O interface(s) 412 allows for input and output of data with other devices that may be connected to a mobile device, an approval device, and/or the server computing device 110. For example, the I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., the program 112, can be stored on such portable computer readable storage media and can be loaded onto the persistent storage 408 via the I/O interface(s) 412. The PO interface(s) 412 also connect to a display 420.

The display 420 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   identifying a first user and a second user of a plurality of users;
   identifying a location for the first user and the second user;
   transmitting input of the first user to a server computing device;
   simultaneously displaying on a display, using diffraction grating, different images at different wavelengths to the first user and the second user based on viewing angles of the first user and the second user, wherein the first user is shown one image at one wavelength of light and the second user is shown another image at another wavelength of light; and
   in response to the first user reaching a predetermined threshold, dynamically altering multiple personalized, dynamic displays associated with the first user using diffraction grating by modifying with the one image at the one wavelength of light shown to the first user based on the transmitted input of the first user, a predicted path of the first user, and the identified location of the first user, wherein the modified wavelength is personalized for the first user based on the angle, speed, and distance from the predetermined threshold and the content displayed within the dynamic display is a location, time, event, or communication that provides information to the first user along the predicted path, while the other image at the other wavelength of light is displayed to the second user.

2. The computer-implemented method of claim 1, wherein the dynamically altering multiple personalized, dynamic displays comprises:
   generating personalized, dynamic images from received input of the first user;
   predicting a route of the first user; and
   automatically changing the personalized, dynamic image in response to the first user reaching a predetermined threshold based on the received input of the first user and the predicted route of the first user.

3. The computer-implemented method of claim 1, wherein dynamically altering multiple personalized, dynamic displays comprises displaying a personalized, dynamic display to each user of the plurality of the users simultaneously based, at least in part on each respective user's location, gaze, and input.

4. The computer-implemented method of claim 1, wherein dynamically altering multiple personalized, dynamic displays comprises:
   analyzing received input of the first user;
   generating personalized images, locations, notifications, and communications based on received input of the first user;
   calculating the first user's positioning by predicting the first user's path; and
   changing the generated personalized images, locations, notifications, and communications as the first user reaches a predetermined threshold.

5. The computer-implemented method of claim 1, wherein displaying multiple, personalized dynamic images comprises transmitting multiple images on multiple wavelengths based on received input, gaze, and predicted path of the plurality of users.

6. The computer-implemented method of claim 1, wherein displaying multiple, personalized dynamic images comprises altering the personalized dynamic images and wavelengths that display each of the personalized dynamic images depending on the first user's predicted path, gaze, and input.

7. The computer-implemented method of claim 1, further comprising:
in response to the first user reaching a predetermined threshold, changing the personalized, dynamic image based on received input of the first user, wherein the predetermined threshold is based on distance and time of the first user with respect to an area and an event.

8. A computer program product on one or more non-transitory computer readable storage media comprising:
program instructions stored on the one or more non-transitory computer readable storage media, the program instructions comprising:
program instructions to identify a first user and a second user of a plurality of users;
program instructions to identify a location for the first user and the second user;
program instructions to transmit input of the first user to a server computing device;
program instructions to simultaneously display on a display, using diffraction grating, different images at different wavelengths to the first user and the second user based on viewing angles of the first user and the second user, wherein the first user is shown one image at one wavelength of light and the second user is shown another image at another wavelength of light; and
in response to the first user reaching a predetermined threshold, program instructions to dynamically alter multiple personalized, dynamic displays associated with the first user using diffraction grating by calculating respective wavelengths for the first user based, at least in part, on a predicted path of the first user, corresponding angles of the first user's eyes, speed of the first user along the predicted path, and distance of the first user to the server computing device, and
modifying the one image at the one wavelength according to the respective calculated wavelengths based on positioning of the first user along the predicted path, wherein modifying the calculated wavelength displays one or more personalized dynamic images and communication relevant to the first user, while the other image at the other wavelength of light is displayed to the second user.

9. The computer program product on one or more non-transitory computer readable storage media of claim 8, wherein the program instructions to dynamically alter multiple personalized, dynamic displays comprise:
program instructions to generate personalized, dynamic images from received input of the first user;
program instructions to predict a route of the first user; and
program instructions to automatically change the personalized, dynamic image in response to the first user reaching a predetermined threshold based on the received input of the first user and the predicted route of the first user.

10. The computer program product on one or more non-transitory computer readable storage media of claim 8, wherein the program instructions to dynamically alter multiple personalized, dynamic displays comprise program instructions to display a personalized, dynamic display to each user of the plurality of the users simultaneously based, at least in part on each respective user's location, gaze, and input.

11. The computer program product on one or more non-transitory computer readable storage media of claim 8, wherein the program instructions to dynamically alter multiple personalized, dynamic displays comprise:
program instructions to analyze received input of the first user;
program instructions to generate personalized images, locations, notifications, and communications based on received input of the first user;
program instructions to calculate the first user's positioning by predicting the first user's path; and
program instructions to change the generated personalized images, locations, notifications, and communications as the first user reaches a predetermined threshold.

12. The computer program product on one or more non-transitory computer readable storage media of claim 8, wherein the program instructions to display multiple, personalized dynamic images comprise program instructions to transmit multiple images on multiple wavelengths based on received input, gaze, and predicted path of the plurality of users.

13. The computer program product on one or more non-transitory computer readable storage media of claim 8, wherein the program instructions to display multiple, personalized dynamic images comprise program instructions to alter the personalized dynamic images and wavelengths that display each of the personalized dynamic images depending on the first user's predicted path, gaze, and input.

14. The computer program product on one or more non-transitory computer readable storage media of claim 8, wherein the program instructions further comprise:
in response to the first user reaching a predetermined threshold, program instructions to change the personalized, dynamic image based on received input of the first user, wherein the predetermined threshold is based on distance and time of the first user with respect to an area and an event.

15. A computer system comprising:
one or more computer processors;
one or more computer readable storage media; and
program instructions stored on the one or more computer readable storage media for execution by at least one of the one or more processors, the program instructions comprising:
program instructions to identify a first user and a second user of a plurality of users;
program instructions to identify a location for the first user and the second user;
program instructions to transmit input of the first user to a server computing device;
program instructions to simultaneously display on a display, using diffraction grating, different images at different wavelengths to the first user and the second user based on viewing angles of the first user and the second user, wherein the first user is shown one image at one wavelength of light and the second user is shown another image at another wavelength of light; and
in response to the first user reaching a predetermined threshold, program instructions to dynamically alter multiple personalized, dynamic displays associated with the first user using diffraction grating by calculating respective wavelengths for the first user based, at least in part, on a predicted path of the first user, corresponding angles of the first user's eyes, speed of the first user along the predicted path, and distance of the first user to the server computing device, and modifying the one image at the one wavelength according to the respective calculated wavelengths based on positioning of the first user along the predicted path, wherein modifying the calculated wavelength displays one or more personalized dynamic images and communication relevant to the first user, while the other image at the other wavelength of light is displayed to the second user.

16. The computer system of claim 15, wherein the program instructions to dynamically alter multiple personalized, dynamic displays comprise:

program instructions to generate personalized, dynamic images from received input of the first user;

program instructions to predict a route of the first user; and program instructions to automatically change the personalized, dynamic image in response to the first user reaching a predetermined threshold based on the received input of the first user and the predicted route of the first user.

17. The computer system of claim 15, wherein the program instructions to dynamically alter multiple personalized, dynamic displays comprise program instructions to display a personalized, dynamic display to each user of the plurality of the users simultaneously based, at least in part on each respective user's location, gaze, and input.

18. The computer system of claim 15, wherein the program instructions to dynamically alter multiple personalized, dynamic displays comprise:

program instructions to analyze received input of the first user;

program instructions to generate personalized images, locations, notifications, and communications based on received input of the first user;

program instructions to calculate the first user's positioning by predicting the first user's path; and program instructions to change the generated personalized images, locations, notifications, and communications as the first user reaches a predetermined threshold.

19. The computer system of claim 15, wherein the program instructions to display multiple, personalized dynamic images comprise program instructions to transmit multiple images on multiple wavelengths based on received input, gaze, and predicted path of the plurality of users.

20. The computer system of claim 15, wherein the program instructions further comprise:

in response to the first user reaching a predetermined threshold, program instructions to change the personalized, dynamic image based on received input of the first user, wherein the predetermined threshold is based on distance and time of the first user with respect to an area and an event.

* * * * *